(12) United States Patent
Nagao et al.

(10) Patent No.: US 6,590,793 B1
(45) Date of Patent: *Jul. 8, 2003

(54) ELECTRIC POWER SUPPLYING APPARATUS USING UNSTABLE ELECTRIC POWER SUPPLY AND CONTROL METHOD THEREFOR

(75) Inventors: Yoshitaka Nagao, Ikoma (JP); Kimitoshi Fukae, Nara (JP); Nobuyoshi Takehara, Soraku-gun (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/914,227

(22) Filed: Aug. 19, 1997

(30) Foreign Application Priority Data

Aug. 23, 1996 (JP) .............................................. 8-240023

(51) Int. Cl.[7] .............................. H02M 3/24; G05F 1/10
(52) U.S. Cl. .......................................... 363/95; 323/222
(58) Field of Search ............................ 363/95; 323/222, 323/906, 299; 320/5, 15, 14, 21

(56) References Cited

U.S. PATENT DOCUMENTS

| | | | | |
|---|---|---|---|---|
| 3,740,636 A | * | 6/1973 | Hogrefe et al. | 320/101 |
| 4,313,078 A | * | 1/1982 | Bilsky et al. | 320/15 |
| 4,649,334 A | * | 3/1987 | Nakajima | 323/299 |
| 4,661,758 A | * | 4/1987 | Whittake | 320/21 |
| 4,678,983 A | * | 7/1987 | Rouzies | 323/222 |
| 4,742,291 A | * | 5/1988 | Bobier et al. | 320/39 |
| 4,797,566 A | * | 1/1989 | Nozaki et al. | 307/43 |
| 4,916,382 A | * | 4/1990 | Kent | 323/299 |
| 5,569,998 A | * | 10/1996 | Cowan | 307/66 |
| 5,621,300 A | * | 4/1997 | Sato et al. | 320/5 |
| 5,654,883 A | * | 8/1997 | Takehara et al. | 363/79 |
| 5,682,305 A | * | 10/1997 | Kurokami et al. | 363/79 |
| 5,869,956 A | * | 2/1999 | Nagao et al. | 323/299 |

FOREIGN PATENT DOCUMENTS

| | | |
|---|---|---|
| JP | 56-132125 | 10/1981 |
| JP | 57-153531 | 9/1982 |
| JP | 6-348352 | 12/1994 |
| JP | 60-74995 | 4/1995 |

\* cited by examiner

Primary Examiner—Rajnikant B. Patel
(74) Attorney, Agent, or Firm—Fitzpatrick, Cella, Harper & Scinto (57) ABSTRACT

An electric power conversion unit 2 for driving a pump 3 run by electric power generated by a solar panel 1, a storage battery 5 connected to the solar panel 1 via the switch 6, and a controller 7 for controlling the electric power conversion unit 2 and the switch 6 are provided. The controller 7 closes the switch 6 during any period when the amount of insolation is large and performs the maximum power point tracking control of the solar panel 1, and otherwise, controls the electric power conversion unit 2 to drive at one of plural fixed frequencies in dependence upon an output voltage from the solar panel 1 by closing the switch 6. Accordingly, it is possible to utilize output from an unstable electric power supply efficiently, such as a solar cell, thereby providing a reliable electric motor driving apparatus having a simple configuration and a control method therefor.

30 Claims, 9 Drawing Sheets

ELECTRIC POWER SUPPLYING APPARATUS USING UNSTABLE ELECTRIC POWER SUPPLY AND CONTROL METHOD THEREFOR

BACKGROUND OF THE INVENTION

The present invention relates to an electric power supplying apparatus supplying electric power generated by an unstable electric power supply to a load and a control method therefor and, more particularly, to an electric power supplying apparatus supplying electric power generated by an unstable electric power supply, such as a solar cell, a wind power generator or a wave activated power generator, which generates variable electric power, as a power source to a load such as an electric motor, and a control method for controlling the electric power supplying apparatus.

Recently, global warming, exhaustion of fossil fuels, and radioactive contamination caused by accidents in nuclear power plants and radioactive wastes have become social issues, and the issues on the terrestrial environment and energy are rapidly attracting the interest of many people. In this situation, the solar cell, for example, which generates electric power from the solar ray that is an inexhaustible clean energy source, is anticipated as the energy source of tomorrow.

There are various sizes of systems using the solar cell, and the electric power required by those systems ranges from several watts to thousands of watts. Further, there are many types of systems: a system which directly uses electric power generated by the solar cell; a system which uses electric power generated by the solar cell to charge a storage battery; and a system which uses electric power generated by the solar cell along with commercial electric power, for example. Among these systems using the solar cell, a system suggested as a solar pump system for drawing water from source, such as a well and a river, for irrigation or drinking is very useful especially in some geographic regions, such as tropical regions, where the amount of insolation is large, and in unelectrified regions, because the running cost of the system and the load of transportation of fuels for running the system can be saved. Further, it is also advantageous for highly electrified cities to own a solar pump system as measures to cope with a natural disaster, such as an earthquake, since it is possible to supply water relatively easily by using the solar pump system in a case where the supply of electric power and water stops.

Figure 2:
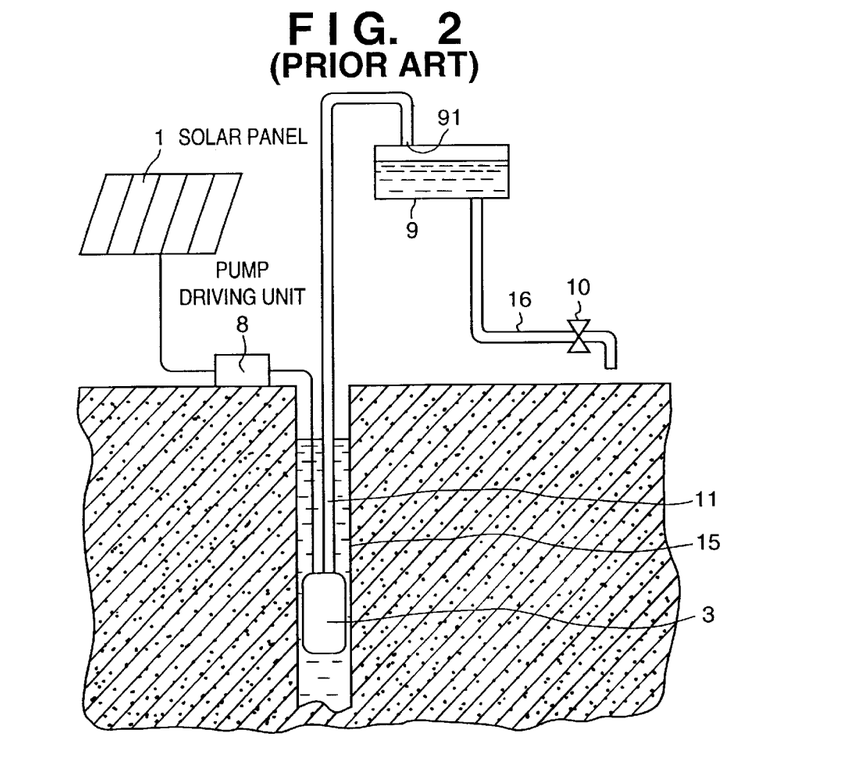
FIG. 2 is a diagram showing a configuration of a water supply system employing a solar pump system.

FIG. 2 is a diagram illustrating a configuration of a water supply system employing a solar pump system. In FIG. 2, direct current (DC) electric power obtained from a solar panel 1, i.e., an unstable electric power supply, is provided to a pump 3 via a pump driving unit 8. The water in a well 15 is drawn through a first liquid conveying pipe 11 up to a water tank 9. The water in the water tank 9 is supplied through a second liquid conveying pipe 16 and a valve 10.

Figure 11:
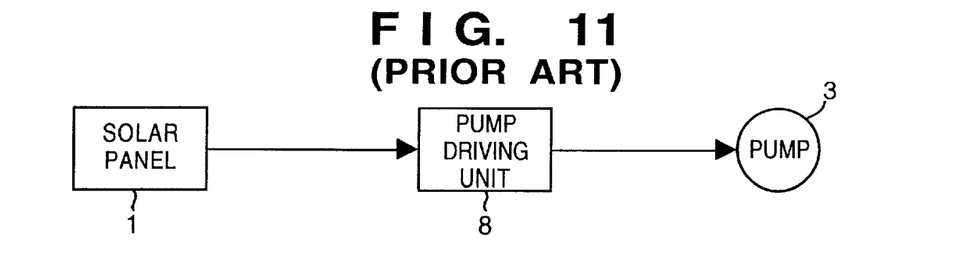
FIG. 11 is a block diagram illustrating a configuration of a conventional solar pump system.

However, the water supply apparatus as shown in FIG. 2 which uses the pump 8 run by electric power supplied only from the solar panel 1 shown in FIG. 11 may not be able to draw water up to the water tank 9 in the mornings and evenings, when an amount of insolation is small, and on cloudy days, since the electric power generated by the solar panel 1 becomes small, and thus although the pump 3 runs, the water does not reach a discharge opening 91.

Figure 12:
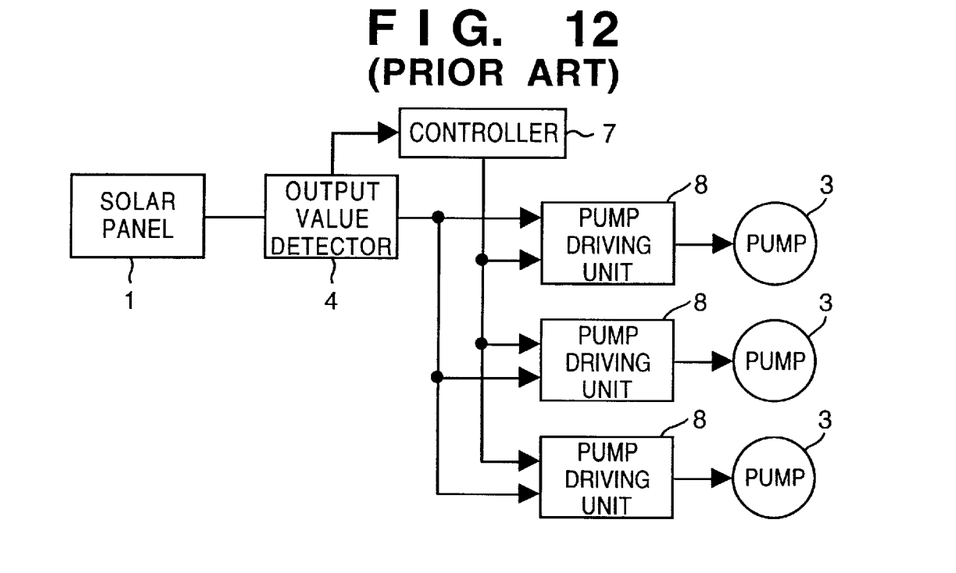
FIG. 12 is a block diagram illustrating a configuration of a conventional solar pump system.

In order not to waste the electric power generated by the solar cell when the amount of insolation is small, methods of using a plurality of low output pumps, as disclosed in Japanese Patent Application Laid-Open Nos. 56-132125 and 57-153531, as shown in FIG. 12, are suggested. However, the higher the output of a pump is, the better its efficiency. Therefore, by using a plurality of low output pumps to obtain a predetermined output and using a part of the pumps to supply water when the amount of insolation is small, less energy is wasted; however, the efficiency is still not good. Furthermore, the initial cost of the apparatus is high since a plurality of pumps are necessary.

Figure 13:
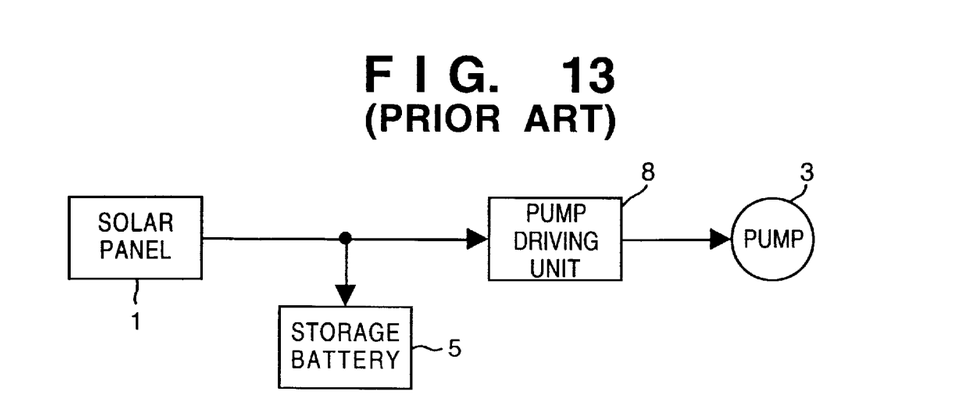
FIG. 13 a block diagram illustrating a configuration of a conventional solar pump system.

Further, a method of driving the pump 3 while storing electric power generated by the solar panel 1 in a storage battery 5, as shown in FIG. 13, is proposed in Japanese Patent Application Laid-Open No. 60-74995. However, according to the configuration shown in FIG. 13, the operation voltage of the solar panel 1 is fixed to a voltage across the storage battery 5, therefore, the solar panel 1 is not operated at the maximum output point. Accordingly, the solar energy is not utilized efficiently.

SUMMARY OF THE INVENTION

The present invention has been made in consideration of the above situation, and has as its object to provide a reliable electric motor driving apparatus, having a simple configuration, which is run by electric power from an unstable power supply, such as a solar cell, capable of efficiently using electric power supplied from the unstable power supply, and a control method for controlling the electric motor driving apparatus.

According to the present invention, the foregoing object is obtained by providing an electric power supplying apparatus comprising, supplying means for supplying electric power generated by an unstable electric power supply to a load, electric power storage means which is connected to the unstable electric power supply in parallel, switching means which is connected between the unstable electric power supply and the electric power storage means in series, and control means for controlling the opening and closing of the switching means and controlling an operation of the supplying means in dependence upon an output from the unstable electric power supply.

The foregoing object is also attained by providing a control method for controlling an electric power supplying apparatus having, supplying means for supplying electric power generated by an unstable electric power supply to a load, electric power storage means which is connected to the unstable electric power supply in parallel, and switching means which is connected between the unstable electric power supply and the electric power storage means in series, the method comprising the steps of opening the switching means during a predetermined period, closing the switching means outside of the predetermined period, and controlling an operation of the supplying means depending upon an output from the unstable electric power supply.

Furthermore, the foregoing object is also attained by providing a control method for controlling an electric power supplying apparatus having, supplying means for supplying electric power generated by an unstable electric power supply, electric power storage means which is connected to the unstable electric power supply in parallel, and switching means which is connected between the unstable electric power supply and the electric power storage means in series, the method comprising the steps of opening the switching means when output electric power of the unstable electric power supply exceeds a predetermined value, closing the switching means when the output electric power is equal to or less than the predetermined value, and controlling an operation of the supplying means depending upon an output voltage of the unstable electric power supply.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A configuration of an electric motor driving apparatus of the present invention will be described in accordance with the accompanying drawings. Note, in the following explanation, a water supply system for drawing water from a well by using an electric pump run by electric power from solar cells is described; however, it is possible to use a wind power generator or a wave activated power generator instead of the solar cell. Further, water can be drawn from a well, a river or a water tank, and the conveying apparatus may convey any liquid or fine powder other than water. Furthermore, liquid or fine powder may be conveyed and supplied by using any apparatus other than a pump, as long as the apparatus is run by electric power.

FIRST EMBODIMENT

Figure 1:
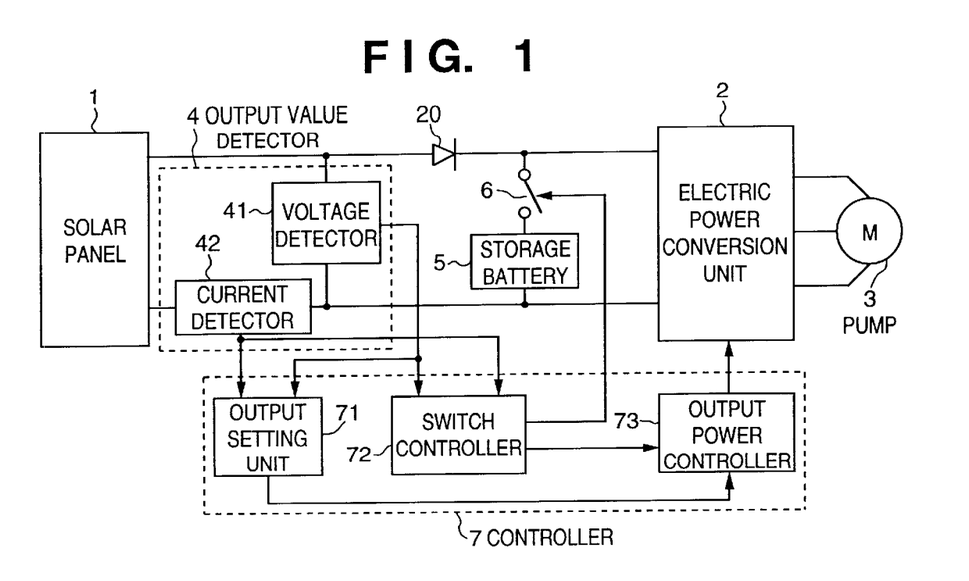
FIG. 1 is a block diagram illustrating a basic configuration of a solar power generation system adopting a voltage control method according to an embodiment of the present invention.

FIG. 1 is a block diagram illustrating a basic configuration of a solar power generation system adopting a voltage control method according to an embodiment of the present invention. The solar power generation system is applied to a water supply apparatus as shown in FIG. 2, for example.

Referring to FIG. 1, direct current (DC) electric power obtained from the solar panel 1, i.e., an unstable electric power supply, is converted by an electric power conversion unit 2 into electric power suitable for a load 3, and provided to the load 3, e.g., a pump. The electric power conversion unit 2, an output value detector 4, a storage battery 5, a switch 6, and a controller 7 configure the electric motor driving apparatus of the present invention. Further, reference numeral 20 denotes a reverse current blocking device, such as a diode, for preventing electric power stored in the storage battery 5 from flowing toward the solar panel 1.

As for solar cells used in the solar panel 1, there are solar cells using non-crystalline silicon, singlecrystalline silicon, polycrystalline silicon, and compound semiconductor. In general, a solar panel having a plurality of solar cells arranged in parallel or series to configure an array or string for obtaining desired voltage and current is used.

The electric power conversion unit 2 may be a DC/DC converter, or a voltage-type self-oscillated DC/AC inverter, using switching elements, such as power transistors, power MOSFETs, insulated gate bipolar transistors (IGBT), and gate turn-off thyristors (GTO). Note, whether to use a DC/DC converter or to use a DC/AC converter depends upon whether to use a pump using a direct-current motor (called "DC pump", hereinafter) or to use a pump using an alternating-current motor (called "AC pump", hereinafter) as the load 3. By changing the on-off duty ratio and frequency of a gate pulse to be provided to the switching elements, an output voltage and frequency of the electric power conversion unit 2 can be controlled.

As for a pump used as the load 3, there are the DC pump and the AC pump, as described above. There are two ways to use The DC pump; directly connecting to the power supply, and connecting to the power supply via a DC/DC converter. However, the DC pump has a contact part, such as an armature for rectification. Because of the lifetime of the armature, the AC pump, having no contact part, is often used. Especially in a large system, the AC pump is preferably used. In this case, DC electric power is converted into alternating current (AC) electric power by a DC/AC inverter, then supplied to the AC pump. Further, as for types of pumps, there are a centrifugal pump and an axial flow pump, for example. The type of the pump may be selected in accordance with its utilization purpose. Note, in a case of using the DC pump by directly connecting to the solar panel 1, the electric power conversion unit 2 may be replaced by a simple switching device. In such case, the switching device may have the same configuration as that of the switch 6 which will be explained later.

The output value detector 4 includes a voltage detector 41 and a current detector 42. The voltage detector 41 divides an output voltage from the solar panel 1 by using registers, and sends a detection signal representing the divided voltage to an output setting unit 71 and a switch controller 72.

The current detector 42 detects a current value by a Hall effective device or a shunt resistor, and transmits a detection signal representing the detected current value to the output setting unit 71 and the switch controller 72 of the controller 7 in a form of an analog signal or a digital signal, similarly to the voltage detector 41.

In order to prevent noise from getting in a signal, it is preferred to provide photocouplers, for example, capable of isolating between input-output, at input terminals of the detection signals and output terminals of control signals of the controller 7, thereby isolating between the controller 7, and the solar panel 1 and the electric power conversion unit 2. Further, in a case where the output setting unit 71 and the switch controller 72 of the controller 7 are configured with digital circuits, the voltage detector 41 and the current detector 42 preferably output digital signals obtained by applying analog-digital conversion on detection signals.

An A/D converter which is used when the voltage detector 41 and the current detector 42 are configured with digital circuits is preferably capable of operating at considerably high speed and high precision. More specifically, the A/D converter preferably has a resolution of more than ten bits and a sampling frequency of more than 50KHz. By using such the A/D converter, it is possible to configure a control system which can response within 1 second with less than 0.1% error.

As the storage battery 5, a secondary battery, such as a lead storage battery, a nickel-hydrogen battery, and an electric double layer capacitor may be used, and the type of the battery may be selected dependent upon the size of a system and a desired storage capacity of the storage battery 5. A battery of relatively small storage capacity, capable of discharging until its terminal-voltage becomes considerably low, may be sufficient. Especially, the nickel-hydrogen battery is capable of discharging until its terminal-voltage becomes considerably low and small in size, and has a long lifetime. Further, the electric double layer capacitor is featured by its semipermanent lifetime. The terminal voltage of the storage battery 5 is preferably adjusted to a voltage substantially the same as an optimum operating voltage, of the solar panel 1.

As for the switch 6, any switching elements, such as a relay, a solid-state relay and a transistor, may be used as long as the switching elements can be opened and closed in response to an external signal and the current capacity and breakdown voltage of the switching elements are large enough to endure the output current and voltage of the solar panel 1 and a current which flows in proportion to electric power required by the load 3.

The controller 7 includes the output setting unit 71, the switch controller 72, and an electric power controller 73.

The output setting unit 71 performs operation on the basis of the detection signals provided from the output value detector 4, determines an output voltage set point value of the solar panel 1, and controls an operation of the electric power conversion unit 2 so that the output voltage of the solar panel 1 becomes the output voltage set point value. The output setting unit 71 may be realized by an analog circuit, however, a parameter can be easily changed by configuring it as a digital circuit and performing the operation with software. In such case, the output setting unit 71 may be realized in a form of a control microcomputer board, and more specifically, may be configured with a CPU, RAM, ROM, an input/output port, a numeral data processor, and so on.

The switch controller 72 performs operation on the basis of the detection signals provided from the output value detector 4, and outputs a signal to the switch 6 and the electric power controller 73. The switch controller 72 may be realized as an analog circuit using operational amplifiers, however, it is preferable to install the function of the switch controller 72 on the aforesaid control microcomputer board.

The reverse current blocking device 20 prevents current from flowing from the storage battery 5 toward the solar panel 1. As the reverse current blocking device 20, a pn junction diode and a schottky-barrier diode, for example, may be used. In a low voltage system, the schottky-barrier diode whose forward drop voltage is low is preferably used in consideration of a loss due to the forward drop voltage. Whereas, in a high voltage system, the pn junction diode for rectification is preferably used in consideration of breakdown voltage, since a pn junction diode which has a high breakdown voltage is available.

The electric power controller 73 is so-called a gate driving circuit, and generates gate pulses in accordance with momentary current comparison method or sinusoidal wave/triangular wave comparison method, for example. In other words, by controlling the frequency and pulsewidth of the gate pulses in accordance with electric power sources indicated by the output from the switch controller 72, namely whether the electric power is to be supplied from the solar panel 1 alone or from the combination of the solar panel 1 and the storage battery 5, the output from the electric power conversion unit 2 is controlled. The electric power controller 73 may be configured by an analog circuit or a digital circuit. Many of electric power conversion apparatuses on the market include circuits corresponding to a part or all of the aforesaid electric power controller 73. Most of those electric power conversion apparatuses are digital apparatuses and each includes a CPU and a digital signal processor (DSP). In a case where an electric power conversion apparatus to be used includes a part or all of the electric power controller 73, the electric power controller 73 of the controller 7 generates signals necessary for operating the electric power controller of the electric power conversion apparatus. In the above case, the function of generating signals necessary for operating the electric power controller of the electric power conversion apparatus is preferably included in the aforesaid control microcomputer board.

When the electric power controller 73 is configured in a digital form, it has a similar configuration as those of the output setting unit 71 and the switch controller 72, and it is possible to realize all of these units 71 to 73 with a single CPU.

The configuration shown in FIG. 1 is set up for an experiment. Ten amorphous silicon solar cell modules (available from United Solar System Corporation, Product Type: UPM-880), connected in series, are used as the solar panel 1. As for the electric power conversion unit 2, a full-bridge three-phase inverter using insulated gate bipolar transistors (IGBT) is used. The IGBT is a high-breakdown-voltage type high-speed switching element, and used in an inverter, ranging from hundreds of watts to tens of kilowatts, by preference. To the output terminal of the inverter, an AC three-phase motor direct coupling type magnet pump is connected.

Figure 5:
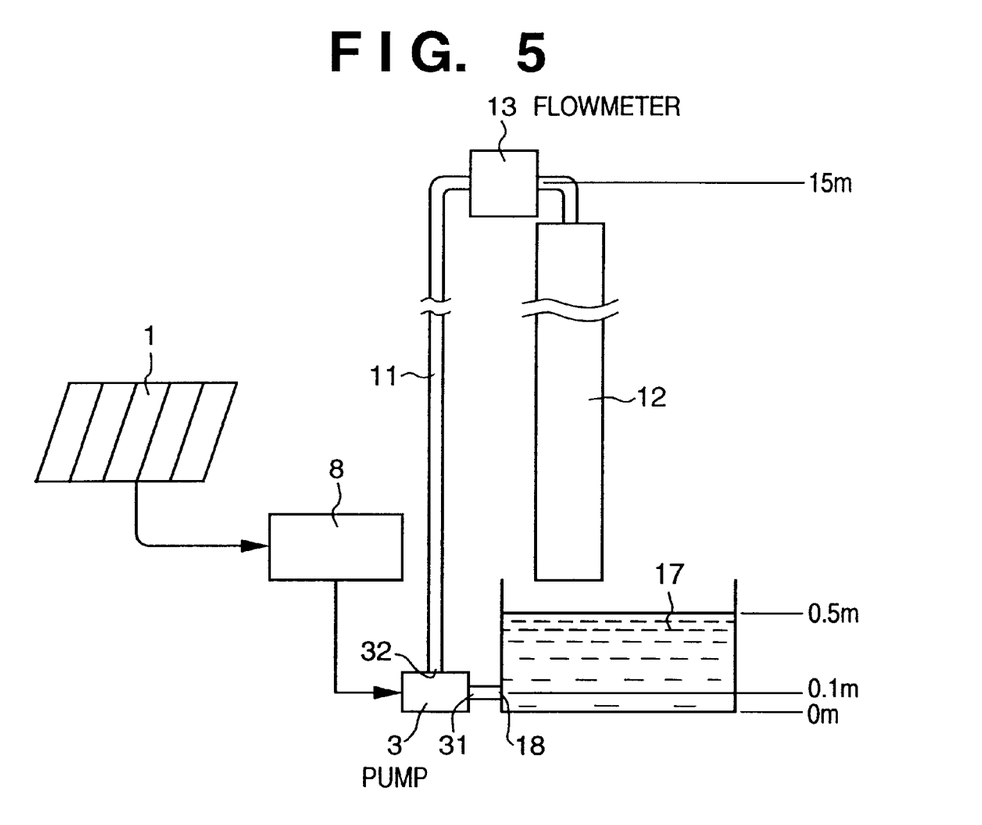
FIG. 5 is a drawing illustrating a configuration of a pump system of the present invention.

A liquid conveying system using a pump is configured as shown in FIG. 5. Water is stored in a water tank 17 made of reinforced plastic (FRP). A liquid discharge opening 18 is provided at 0.1 m above the bottom of the water tank 17 (reference surface: 0 m) and an intake 31 of the pump 3 is connected to it. Water is stored until the water level reaches 0.5 m above the bottom of the water tank 17. Further, a vinyl chloride pipe having an internal diameter of 50 mm is used as a conveyance path 11 of the liquid, and the water is drawn up to 15 m above a discharge opening 32 of the pump 3. Middle of the conveyance path 11, a flowmeter 13 is attached, and an end of the conveyance path 11 is inserted into a hard vinyl chloride pipe 12 having an internal diameter of 75 mm. With the liquid conveying system as described above, water is drawn up to 15 m above the discharge opening 32 of the pump 3 by the pump 3, thereafter, it is returned to the water tank 17 via the pipe 12 serving as a drain.

Further, the voltage detector 41 of the output value detector 4 digitizes a detection signal, obtained by dividing an output voltage of the solar panel 1 into a ratio of 20 to 1 by using resistors, by using an A/D converter (not shown) of 10V-full scale twelve-bit resolution, and outputs an eight-bit parallel signal to the controller 7.

The current detector 42 has a 10 mΩ shunt resistor which is inserted to the output loop of the solar panel 1 in series, and a voltage across the shunt register is amplified by 500 times by using an operational amplifier (not shown). Thereafter, the amplified voltage is converted into a digital value of twelve bits by using an A/D converter (not shown), similarly to the one used in the voltage detector 41, and outputted to the controller 7 as an eight-bit parallel signal.

As for the controller 7, a microcomputer board using a 8086 CPU which is available from Intel Corporation is used. On the board, a general-purpose parallel input/output port, a memory, a numerical data processor, a serial interface, and so on, are provided, thus, its configuration is suitable for the present invention.

To set an output value of the electric power conversion unit 2 by the controller 7 is to control an output frequency of the electric power conversion unit 2 so as to perform a maximum power point tracking (MPPT) control of the solar panel 1 by using an electric power control method disclosed in Japanese Patent Laid-Open No. 6-348352 by the CPU of the microcomputer board.

Further, in a switching control by the controller 7, electric power is calculated from a voltage value inputted from the voltage detector 41 and a current value inputted from the current detector 42 by the CPU, and whether to open or close the switch 6 is determined on the basis of the calculated electric power and the voltage value. In relation with this determination, a start/stop signal, or a reset signal is transmitted from the parallel output port to a control circuit of the electric power conversion unit 2 for starting, stopping or resetting the pump 3.

Regarding the electric power control by the electric power conversion unit 2, sinusoidal wave/triangular wave comparison method for comparing a sinusoidal wave whose frequency is determined on the basis of the output setting instruction from the controller 7 and a triangular wave of a carrier frequency of 2 kHz, and changing the duty (=ON time/(ON time +OFF time) of the gate pulse is adopted.

Furthermore, as the storage battery 5, thirteen lead storage batteries of 12V are connected in series.

Method for Controlling The Pump System

Next, a method for controlling the pump system according to the first embodiment is explained with reference to a flowchart in FIG. 6.

A solar-cell-independent-driving mode period during which the pump 3 is run only by electric power from the solar panel 1 is determined in advance. Then, at step S1, an output voltage Vpv of the solar panel 1 is obtained by the voltage detector 41, and at step S2, whether or not the current time is within the solar-cell-independent-driving mode time is determined by using an internal clock of the CPU of the microcomputer board. If the current time is outside of the solar-cell-independent-driving mode period, then at step S3, a storage-battery-connection instruction signal for instructing to connect to the storage battery 5 and the switch 6 is closed, thereby, connecting the storage battery 5 to the reverse current blocking device 20 and the electric power conversion unit 2. As a result, the output voltage Vpv of the solar panel 1 is fixed to a voltage substantially equal or higher than the terminal voltage of the storage battery 5.

Under this state, in step S4, the output voltage Vpv is compared to a predetermined start-charging voltage (or discharge-prohibition voltage) Vcs. If Vpv≦Vcs, then an inverter-stop instruction signal for stopping operation of an inverter in the electric power conversion unit 2 is outputted at step S5, thereby a stopping state of an operation of the electric power conversion unit 2 is kept and the storage battery 5 is charged by the electric power generated by the solar panel 1 (state 1: charging mode).

In the state 1, the storage battery 5 is gradually charged by the electric power generated by the solar panel 1. When the Vpv exceeds Vcs, the present state is decided whether the state 1 or not at step S10. If the present state is the state 1, the flow of the processing is proceeded to step S6.

In step S6, the output voltage Vpv is compared to a predetermined discharge-enable voltage (or charge-prohibition voltage) Vde. If Vpv≧Vde, then an inverter-fixed-frequency-driving instruction signal is outputted in step S7. Accordingly, the electric power conversion unit 2 is driven at a predetermined frequency and the pump 3 is driven by an electric power discharged from the storage battery 5 and the electric power generated by the solar panel 1 (state 2: solar cell and storage battery using mode). The predetermined frequency, namely, the output frequency of the electric power conversion unit 2 in the state 2 may be determined so as to keep a balance between an amount of water to be drawn and a charged amount of the storage battery 5.

Therefore, according to the decision in step S4 and S10, the state 2 is kept while Vpv>Vcs. If Vpv drops below Vcs, the inverter-stop instruction signal is outputted at step 5, thereby the operation of the electric power conversion unit 2 is stopped, and the present state is returned to the state 1.

In other words, the state 1 and state 2 are repeated in the outside of the solar-cell-independent-driving mode period.

Whereas, during the solar-cell-independent-driving mode period, the storage-battery-connection instruction signal is released, and the switch 6 is opened. As a result, the electric power conversion unit 2 is run only by electric power generated by the solar panel 1. Then, the maximum power point tracking (MPPT) control is performed by controlling the output frequency of the electric power conversion unit 2.

Figure 4:
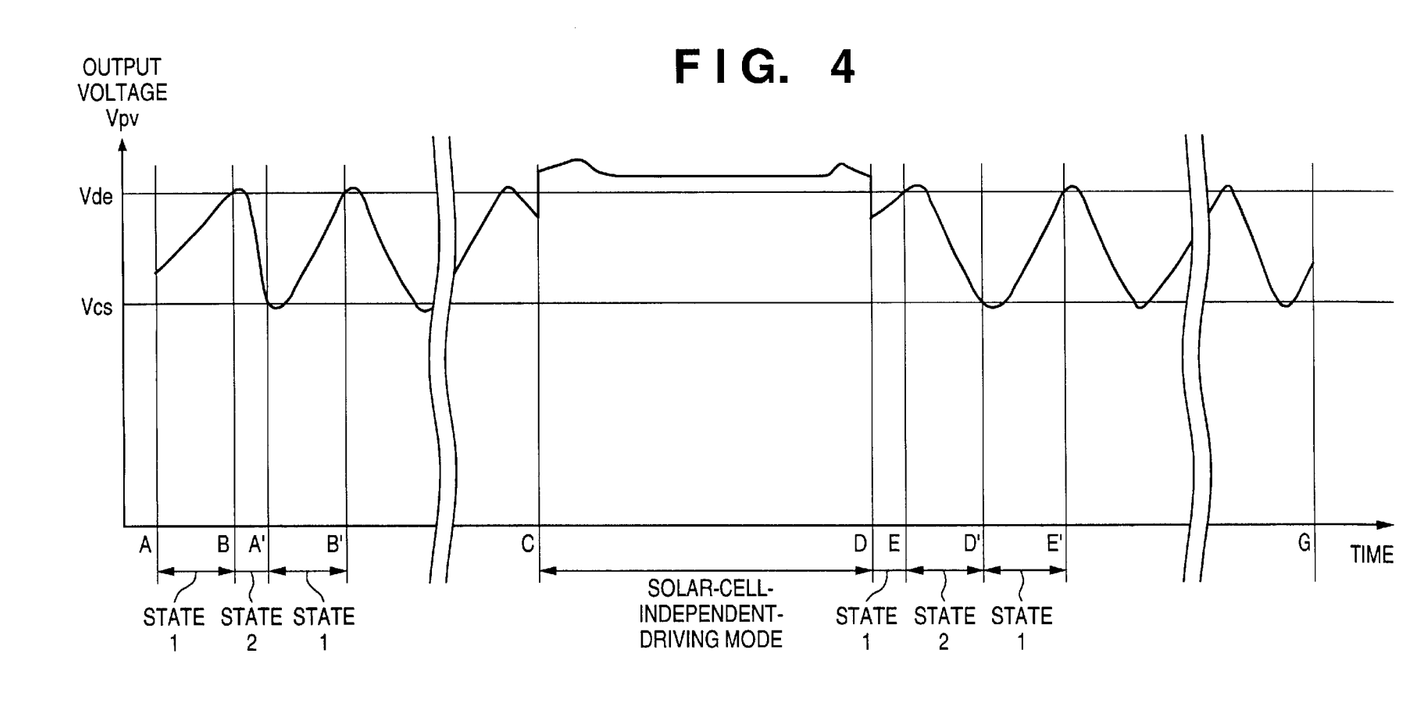
FIG. 4 is a graph showing an example of transition of output voltage Vpv from the solar panel.

FIG. 4 illustrates an example of transition of the output voltage Vpv of the solar panel 1.

Referring to FIG. 4, time A, when the system starts operating, is outside of the solar-cell-independent-driving mode period. Therefore, when the output voltage Vpv of the solar panel 1 is equal or higher than the start-charging voltage Vcs, the system starts operating in the state 1. Thereafter, as the electric power generated by the solar panel 1 increases, since the storage battery 5 is charged and its terminal voltage increases, the output voltage Vpv also increases. At time B when the output voltage Vpv exceeds the discharge-enable voltage Vde, the operating mode changes to the state 2. The states 1 and 2 are repeated alternately until predetermined time C.

In a period between the time C and time D, the storage battery 5 is disconnected, and the system is operated in the solar-cell-independent-driving mode, and the voltage Vpv becomes a voltage near the maximum power point by the MPPT control.

In the time D, the driving mode changes to the state 1 or state 2. Thereafter, until time G when the system stops operating, the system may be operated in the states 1 and 2, alternately.

Here, the start-charging voltage Vcs is set so that the storage battery 5 does not become over-discharged state, and the discharge-enable voltage Vde is set so that the storage battery 5 does not become over-charged state.

The aforesaid maximum power point tracking control of the solar panel 1 in the first embodiment is performed by using an electric power control method as disclosed in the Japanese Patent Application Laid-Open No. 6-348352. Thereby, it is possible to efficiently obtain electric power from the solar panel 1. It should be noted that various methods of the maximum power point tracking control are suggested, and it is possible to adopt any of these methods.

Figure 7:
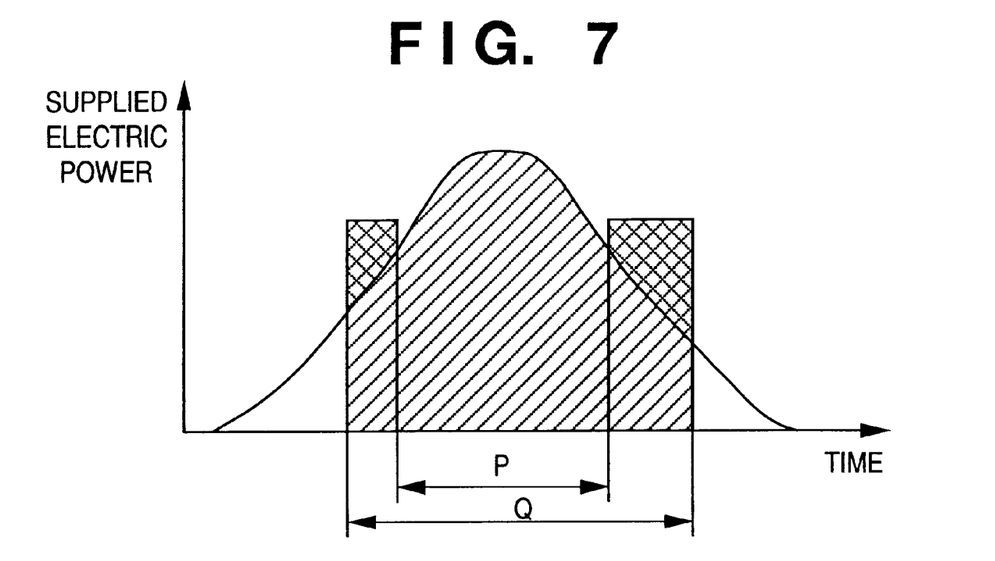
FIG. 7 is a graph for explaining a utilization time period during day light of the pump system according to the first embodiment.

As a result of driving the pump 3 during day light as described above, a driving time period was 6 hours and 40 minutes, as shown by a period Q in FIG. 7. When the pump 3 was driven in the same day without using the storage battery 5, a driving time period was 5 hours and 57 minutes. Thus, the driving time period was extended by 43 minutes according to the present invention.

SECOND EMBODIMENT

In a second embodiment, twenty amorphous silicon solar cell modules (available from United Solar System Corporation, Product Type: MBC-131), connected in series, are used as the solar panel 1. The solar panel 1 is connected to an AC three-phase motor direct coupling type magnet pump 5 (available from Sanso Electric Co., Ltd., Product Type: PMD-613B2M) via the electric power conversion unit 2 and a general-purpose inverter (available from Mitsubishi Electric Corporation, Product Type: FREQROL-U100) which is a controller of the electric power conversion unit 2. Originally, this general-purpose inverter is designed for converting AC electric power to DC electric power, however, it can be used for inverting DC electric power generated by the solar cell to AC electric power, because it rectifies the AC electric power into the DC electric power and further converts the DC electric power into the AC electric power, by supplying the DC electric power generated by the solar cell instead of the rectified DC electric power.

Liquid conveyance by using the pump 3 is performed in the same manner as described with reference to FIG. 5 in the first embodiment. However, a vinyl hose having an internal diameter of 25 mm is used as the conveyance path 11, water is drawn up to 2 m, and the drawn water is returned to the water tank 17 through the hard vinyl chloride pipe 12 having an internal diameter of 50 mm as a drain.

Further as the controller 7, a personal computer (available from NEC Corporation, Product Type: PC-9801DA) is used. In this system, the voltage detector 41 divides the output voltage from the solar panel 12 into 100:1 by resisters, and transmits the divided voltage to an A/D conversion input port of an extension card (available from Kabushikikaisha Adtek System Science, Product Type: AB98-57B) having a parallel I/O port, and of A/D and D/A converters of 5V-full scale twelve-bit resolution, which is inserted into an extension slot of the personal computer. The current detector 42 has a 10 mΩ shunt resistor which is inserted to the output loop of the solar panel 1 in series, and the voltage across the shunt resistor is amplified by 500 times by an operational amplifier. Thereafter, similarly to the voltage detector 41, the current detector 42 transmits a voltage signal to another A/D conversion input port of the extension card.

The function of the output setting unit 71 is also realized by the personal computer, and an operation result by a CPU of the personal computer is transmitted to a control circuit of a general-purpose inverter from the D/A conversion output port of the extension card. Further, in order to start, stop, and reset the general-purpose inverter, a start/stop signal or a reset signal is inputted to the control circuit of the general-purpose inverter via the parallel I/O port.

The function of the switch controller 72 is also realized by the personal computer. The electric power value is calculated by the CPU of the personal computer on the basis of the voltage value and the current value obtained by the output value detector 4, and whether to open or close the switch 6 is determined in dependence upon the electric power value and the voltage value. In response to the determination, the aforesaid start/stop signal is sent to the control circuit of the general-purpose inverter via the parallel I/O port in order to start or stop the pump 3.

As for the storage battery 5, 22 nickel-hydrogen battery of 12V (storage capacity of 0.2 Ah) connected in series are used.

Method for Controlling The Pump System

Figure 8:
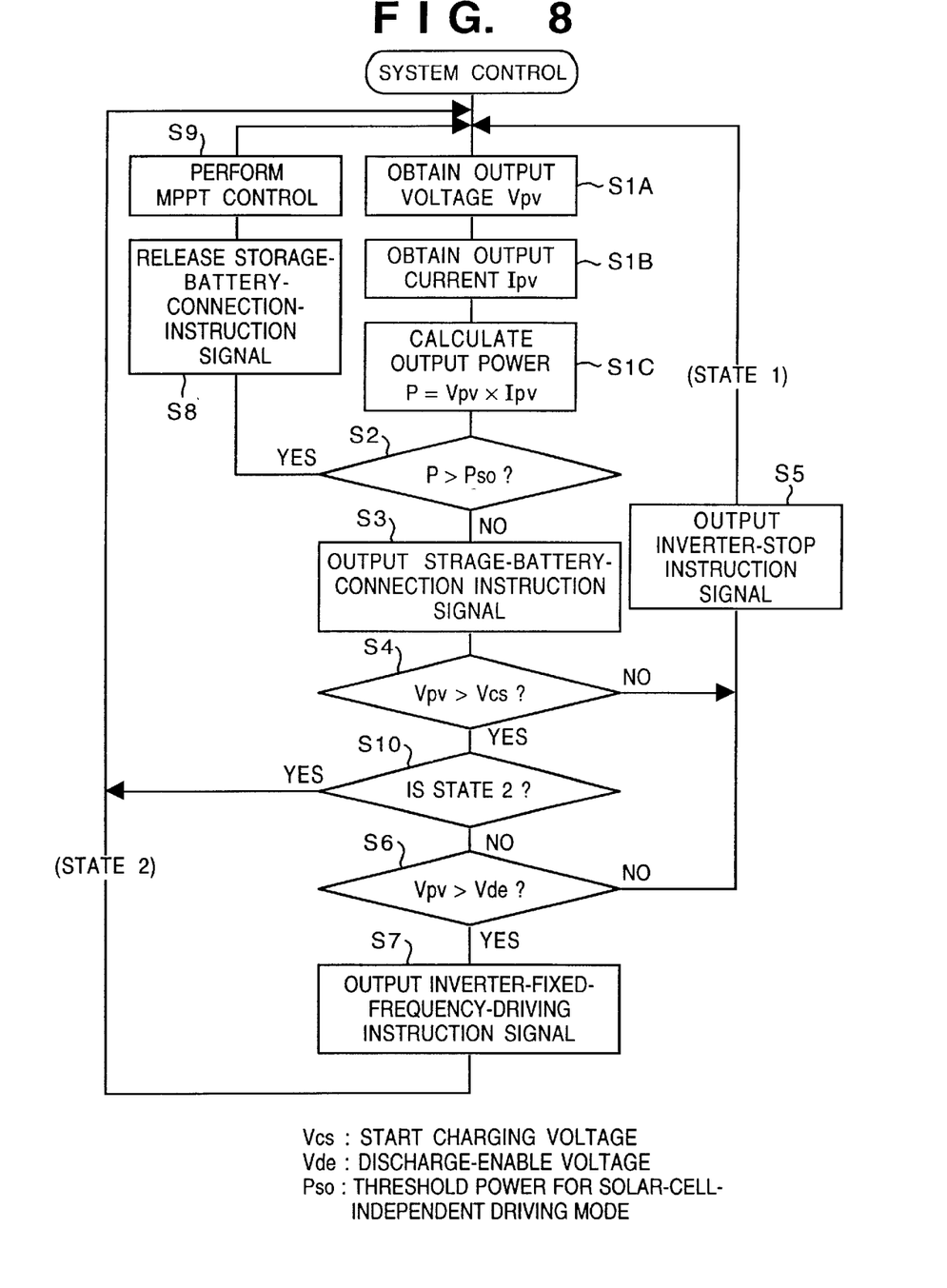
FIG. 8 is a flowchart showing a control method for the pump system according to a second embodiment.

Next, a method for controlling the pump system according to the second embodiment is explained with reference to a flowchart in FIG. 8. Note, in FIG. 8, the same steps as those in FIG. 6 are referred by the same reference numerals, and explanation of those steps are omitted.

First in steps S1A and S1B, the output voltage Vpv and an output current Ipv from the solar panel 1 are obtained from outputs of the output value detector 4. In step S1C, the product of Vpv and Ipv is calculated to obtain the output electric power P of the solar panel 1. Then, the calculated output electric power P is compared to a predetermined electric power value Pso at which the driving mode changes to the solar-cell-independent-driving mode in step S1D, and if P≦Pso, then the process proceeds to step S3, where the aforesaid storage-battery-connection instruction signal is outputted. Whereas, if P>Pso, the storage-battery-connection instruction signal is released in step S8, and in step S9, the MPPT control is performed.

More specifically, when the generated electric power P is equal or less than the predetermined electric power Pso with which the pump 3 can not draw water, the system is operated in the aforesaid state 1 or 2 depending upon the output voltage Vpv.

Whereas, when the electric power P generated by the solar panel 1 exceeds the electric power Pso, the switch 6 is opened, and the general-purpose inverter is run only by the electric power generated by the solar panel 1. Then, by controlling the output frequency of the general-purpose inverter, the MPPT control is performed.

Figure 9:
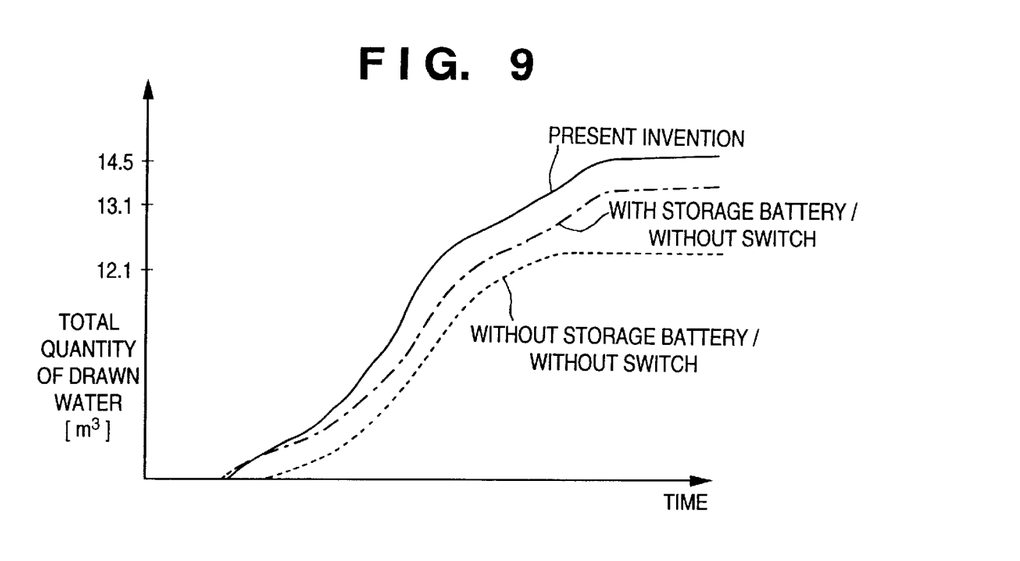
FIG. 9 is a graph for illustrating ability of the pump system according to the second embodiment.

As a measured result of the drawn water by the aforesaid pump system during day light, the total quantity of drawn water in a sunny day with 6.0 kWh/(day·m$^2$) of insolation was 14.5 m$^3$ as shown in FIG. 9. Further, the total quantity of drawn water under the same condition without the storage battery 5 was 12.1 m$^3$, and the total quantity of drawn water under the same condition with the storage battery 5 but without the switch 6 was 13.1 m$^3$. Thus, the pump system adopting the present invention is driven more efficiently.

Furthermore, when nickel-hydrogen batteries are used as the storage battery 5 according to the second embodiment, the storage battery 5 weighed about 0.7 kg. In order to obtain the equivalent capacitance with lead storage batteries, the storage battery 5 weighs about 2.1 kg. Accordingly, by using the nickel-hydrogen batteries, the total weight of the solar power generating system is lightened according to the second embodiment.

Further, when water can not be drawn by running the pump 3 only on electric power from the solar panel 1 in a cloudy day or a rainy day, it is possible to draw water by the pump 3 by using electric power stored in the storage battery 5.

THIRD EMBODIMENT

In a third embodiment, twenty amorphous silicon solar cell modules (available from United Solar System Corporation, Product Type: MBC-131), connected in series, are used as the solar panel 1. The solar panel 1 is connected to the DC pump 3 via a DC/DC converter, which is the electric power conversion unit 2. Other configuration is the same as that shown in FIG. 1.

The liquid conveyance path 11 of water drawn by the pump 3 is the same as that shown in FIG. 5.

The DC/DC converter can change DC output voltage in accordance with an external signal.

The voltage detector 41 divides an output voltage of the solar panel 1 to 20:1 by resistors, and transmits an eight-bit parallel signal representing the divided voltage to the output setting unit 71 and the switch controller 72.

The current detector 42 has a 10 mΩ shunt resistor which is inserted to the output loop of the solar panel 1 in series, and the voltage across the shunt resistor is amplified by 500 times by an operation amplifier, then the current detector 42 sends the amplified voltage to the output setting unit 71.

A microcomputer board on which a CPU, available from Mitsubishi Electric Corporation (Product Type: M37710) is installed is used as the output setting unit 71 and the switch controller 72. On this microcomputer board, a general-purpose parallel I/O port, a memory, a serial interface, an A/D converter, and so on, are provided, which is suitable for the third embodiment. An operation result by the CPU of the microcomputer board is send to a control circuit of the DC/DC converter as an output voltage set point value. Further, in order to start and stop the pump 3, a start/stop signal is transmitted to the control circuit of the DC/DC converter via the general-purpose parallel I/O port of the microcomputer board.

A method for controlling the pump system according to the third embodiment is the same as that explained with reference FIG. 8 in the second embodiment.

Figure 10:
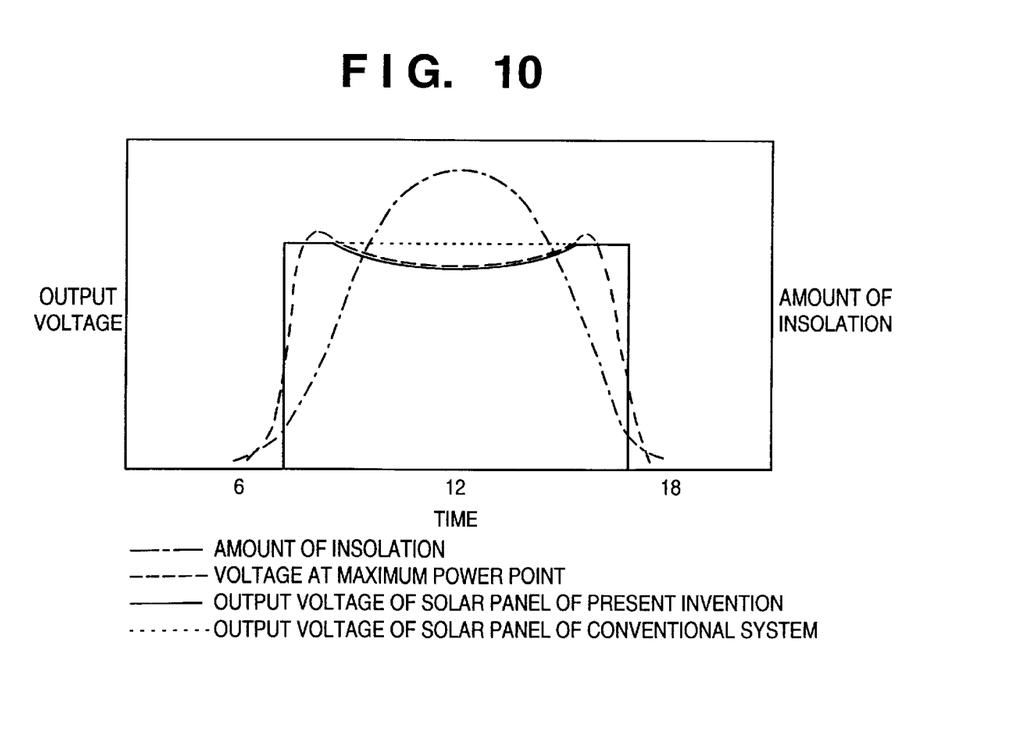
FIG. 10 is a graph showing a transition of output voltage from the solar panel in a system according to a third embodiment.

As a result of operating the pump system having a configuration as described above, the output voltage of the solar panel 1 is as shown by a solid line in FIG. 10. As seen in FIG. 10, it is possible to control the solar panel 1 so that the output voltage of the solar panel 1 becomes a voltage near the maximum power point when the amount of insolation is high. Therefore, comparing to a conventional system, in which the storage battery 5 is connected without the switch 6, which always operates at the terminal voltage of the storage battery 5 (obtained output voltage is expressed by a broken line in FIG. 10), efficiency of utilization of the electric power generated by the solar panel 1 by the system of the present invention is improved.

Figure 3:
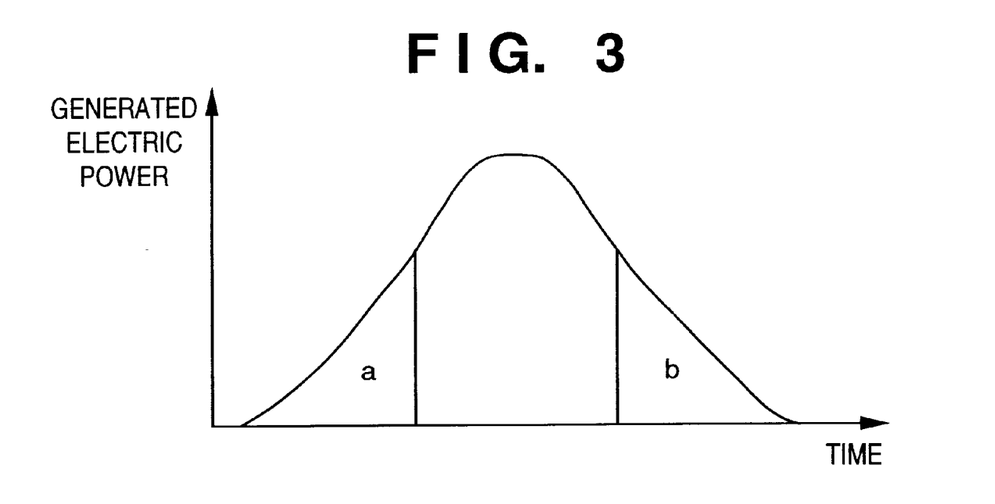
FIG. 3 is a graph showing a transition of electric power generated by the solar panel in a sunny day.

According to the configuration of the pump system described in the first to third embodiments, by providing the storage battery 5, water can be drawn without wasting electric energy obtained under low insolation condition. More specifically, FIG. 3 shows a transition of electric power generated by the solar panel 1 in a sunny day, and in a conventional case of drawing water to the water tank 9 by using a single pump without using the storage battery 5, the generated electric power a and b, i.e., electric power generated under low insolation condition, is wasted. In contrast, according to the above embodiments, since the generated electric power a and b is stored in the storage battery 5, little generated electric power is wasted. As for the storage capacity of the storage battery 5, since the electric power stored in the storage battery 5 is for compensating the electric power generated by the solar panel 1 to drive the pump system according to the above embodiments, a storage battery of relatively small storage capacity will be sufficient.

In the electric motor driving apparatus run by electric power supplied from an unstable electric power supply and a solar pump system driven by the electric motor driving apparatus, having a storage battery and a switching unit, by controlling the switching unit and an electric power conversion unit in accordance with the electric power generated by solar cells, the following advantages are achieved.

(1) It is possible to use solar power efficiently by storing the electric power generated by the solar cell under low insolation condition in a storage battery, increase efficiency of a pump comparing to a case of using a plurality of pumps, since a single pump is used in the present invention, and lower the cost of the apparatus and system.

(2) When the storage battery is charged sufficiently, the electric power generated by the solar cell under the low insolation condition is directly provided to the electric power conversion unit, such as an inverter, and deficient electric power for operating a pump is supplied from the storage battery. Therefore, when electric power is directly supplied to the electric power conversion unit, no electric power is wasted, differing from a case of charging and discharging the storage battery. Accordingly, comparing to a system which stores all the electric power generated by solar cells in a storage battery, more efficient utilization of the generated electric power is realized.

(3) When the system is run only by electric power generated by the solar cells, the storage battery is disconnected by using the switching unit. Therefore, the maximum power point tracking control of the solar cells can be performed without being affected by a terminal voltage of the storage battery, thus, it is possible to increase efficiency of utilization of the electric power generated by the solar cells.

(4) Since a single pump is used, a control unit is constructed with a simple configuration.

(5) Since the required storage capacity of the storage battery is relatively small, it is possible to realize the apparatus and system at low cost.

(6) By using nickel-hydrogen batteries and an electric double layer capacitor capable of discharging until its terminal-voltage becomes considerably low, as a storage battery, it is possible to reduce the size and weight of the apparatus and system, and lengthen the lifetime of the apparatus and system.

The present invention is not limited to the above embodiments and various changes and modifications can be made within the spirit and scope of the present invention. Therefore to appraise the public of the scope of the present invention, the following claims are made.

What is claimed is:

1. An electric power supplying apparatus comprising:
   an unstable power supply that generates electric power;
   an electric power storage unit that is connected to said unstable electric power supply in parallel;
   a switch that is connected between said unstable electric power supply and said electric power storage unit in series;

a converter that converts electric power supplied from said unstable electric power supply, or from both said unstable electric power supply and said electric power storage unit, to electric power which is suitable for a load so as to supply the converted electric power to the load; and a controller that controls opening and closing of said switch and controls an operation of said converter based on an output from the unstable electric power supply so as to efficiently operate the unstable electric power supply, wherein said controller opens said switch during an independent-driving mode period and closes said switch outside of the independent-driving mode period.

2. The apparatus according to claim 1, wherein the load is an electric pump.

3. The apparatus according to claim 1, wherein said electric power storage unit is a nickel-hydrogen battery or an electric double layer capacitor.

4. The apparatus according to claim 1, wherein said unstable electric power supply is a solar power generator or a wind power generator.

5. An electric power supplying apparatus comprising:
an unstable power supply that generates electric power;
an electric power storage unit that is connected to said unstable electric power supply in parallel;
a switch that is connected between said unstable electric power supply and said electric power storage means in series;
a converter that converts electric power supplied form said unstable electric power supply, or from both said unstable electric power supply and said electric power storage unit, to electric power which is suitable for a load so as to supply the converted electric power to the load; and
a controller that controls opening and closing of said switch and controls operation of said converter based on an output from the unstable electric power supply so as to efficiently operate the unstable electric power supply,
wherein said controller opens said switch when an output power from said unstable power supply exceeds a predetermined value and closes said switch when the output power is equal or less than the predetermined value.

6. The apparatus according to claim 1, wherein, when said switch is closed, said controller controls the operation of said converter if an output voltage from said unstable electric power supply exceeds a first predetermined voltage, and stops the operation of said converter if the output voltage drops below a second predetermined voltage.

7. The apparatus according to claim 1, wherein said controller controls the operation of said converter to track a maximum power point of said unstable electric power supply when said switch is open, and controls said converter to output alternating current electric power at a predetermined frequency when said switch is closed.

8. The apparatus according to claim 1, wherein said controller comprises a detector that detects an output voltage and an output current from the unstable electric power supply.

9. A control method of controlling an electric power supplying apparatus, to efficiently operate an unstable power supply which generates electric power, having:
an electric power storage unit that is connected to the unstable electric power supply in parallel;

a switch that is connected between the unstable electric power supply and the electric power storage unit in series; and
a converter that converts electric power supplied from the unstable electric power supply, or from both the unstable electric power supply and the electric power storage unit, to electric power which is suitable for a load so as to supply the converted electric power to the load, said method comprising the steps of:
opening the switch during an independent-driving mode period;
closing the switch outside of the independent-driving mode period; and
controlling an operation of the converter depending upon an output from the unstable electric power supply.

10. The control method according to claim 9, wherein, when the switch is closed, in said controlling step, the converter is operated when an output voltage from the unstable electric power supply exceeds a first predetermined voltage, and the operation of the converter is stopped when the output voltage drops below a second predetermined voltage.

11. The control method according to claim 9, wherein in said controlling step, the operation of the converter is controlled to track a maximum power point of the unstable electric power supply when the switch is opened, and to output alternating current electric power at a predetermined frequency when the switch is closed.

12. A control method of controlling an electric power supplying apparatus, to efficiently operate an unstable power supply which generates electric power, having:
an electric power storage unit that is connected to the unstable electric power supply in parallel;
a switch that is connected between the unstable electric power supply and the electric power storage unit in series; and
a converter that converts electric power supplied from the unstable electric power supply, or from both the unstable electric power supply and the electric power storage unit, to electric power which is suitable for a load so as to supply the converted electric power to the load, said method comprising the steps of:
opening the switch when output electric power of the unstable electric power supply exceeds a predetermined value;
closing the switch when the output electric power is equal or less than the predetermined value; and
controlling an operation of the converter depending upon an output voltage of the unstable electric power supply.

13. The control method according to claim 12, wherein, when the switch is closed, in said controlling step, the converter is operated when an output voltage from the unstable electric power supply exceeds a first predetermined voltage, and the operation of the converter is stopped when the output voltage drops below a second predetermined voltage.

14. The control method according to claim 12, wherein in said controlling step, the operation of the converter is controlled to track a maximum power point of the unstable electric power supply when the switch is opened, and to output alternating current electric power at a predetermined frequency when the switch is closed.

15. The apparatus according to claim 5, wherein, when said switch is closed, said controller controls the operation of said converter if an output voltage from said unstable electric power supply exceeds a first predetermined voltage, and stops the operation of said converter if the output voltage drops below a second predetermined voltage.

16. The apparatus according to claim 5, wherein said controller controls the operation of said converter to track a maximum power point of said unstable electric power supply when said switch is open, and controls said converter to output alternating current electric power at a predetermined frequency when said switch is closed.

17. The apparatus according to claim 5, wherein said controller comprises a detector which detect an output voltage and an output current from said unstable electric power supply.

18. The apparatus according to claim 5, wherein the load is an electric pump.

19. The apparatus according to claim 5, wherein said electric power storage is a nickel-hydrogen battery or an electric double layer capacitor.

20. The apparatus according to claim 5, wherein said unstable electric power supply is a solar power generator or a wind power generator.

21. An electric supplying apparatus comprising:
an unstable power supply which generates electric power;
an electric power storage which is connected to said unstable electric power supply in parallel;
a switch which is connected between said unstable electric power supply and said electric power storage in series;
a power converter which converts electric power supplied from said unstable electric power supply, or from both said unstable electric power supply and said electric power storage, to electric power which is suitable for a load so as to supply the converted electric power to the load; and
a controller which controls opening and closing of said switch and controls an operation of said power converter based on an output from said unstable electric power supply so as to efficiently operate said unstable electric power supply,
wherein, when said switch is closed, said controller controls the operation of said converter if an output voltage from said unstable electric power supply exceeds a first predetermined voltage, and stops the operation of said converter if the output voltage drops below a second predetermined voltage.

22. The apparatus according to claim 21, wherein the load is an electric pump.

23. The apparatus according to claim 21, wherein said electric power storage is a nickel-hydrogen battery or an electric double layer capacitor.

24. The apparatus according to claim 21, wherein said unstable electric power supply is a solar power generator or a wind power generator.

25. The apparatus according to claim 21, wherein said controller comprises a detector which detects an output voltage and an output current from said unstable electric power supply.

26. An electric power supplying apparatus comprising:
an unstable power supply which generates electric power;
an electric power storage which is connected to said unstable electric power supply in parallel;
a switch which is connected between said unstable electric power supply and said electric power storage in series;
a power converter which converts electric power supplied from said unstable electric power supply, or from both said unstable electric power supply and said electric power storage, to electric power which is suitable for a load so as to supply the converted electric power to the load; and
a controller which controls opening and closing of said switch and controls an operation of said power converter based on an output from said unstable electri power supply so as to efficiently operate said unstable electric power supply,
wherein said controller controls the operation of said converter to track a maximum power point of said unstable electric power supply when said switch is open, and controls said converter to output alternating current electric power at a predetermined frequency when said switch is closed.

27. The apparatus according to claim 26, wherein the load is an electric pump.

28. The apparatus according to claim 26, wherein said electric power storage is a nickel-hydrogen battery or an electric double layer capacitor.

29. The apparatus according to claim 26, wherein said unstable electric power supply is a solar power generator or a wind power generator.

30. The apparatus according to claim 26, wherein said controller comprises a detector which detector which detects an output voltage and an output current from said unstable electric power supply.

* * * * *

UNITED STATES PATENT AND TRADEMARK OFFICE
CERTIFICATE OF CORRECTION

PATENT NO. : 6,590,793 B1
DATED : July 8, 2003
INVENTOR(S) : Yoshitaka Nagao et al.

It is certified that error appears in the above-identified patent and that said Letters Patent is hereby corrected as shown below:

Title page,
Item [56], References Cited, U.S. PATENT DOCUMENTS,
"4,661,758 A * 4/1987 Whittake" should read -- 4,661,758 A * 4/1987 Whittaker --.
Item [57], ABSTRACT,
Line 10, "in dependence" should read -- dependence --.

Figure 6:
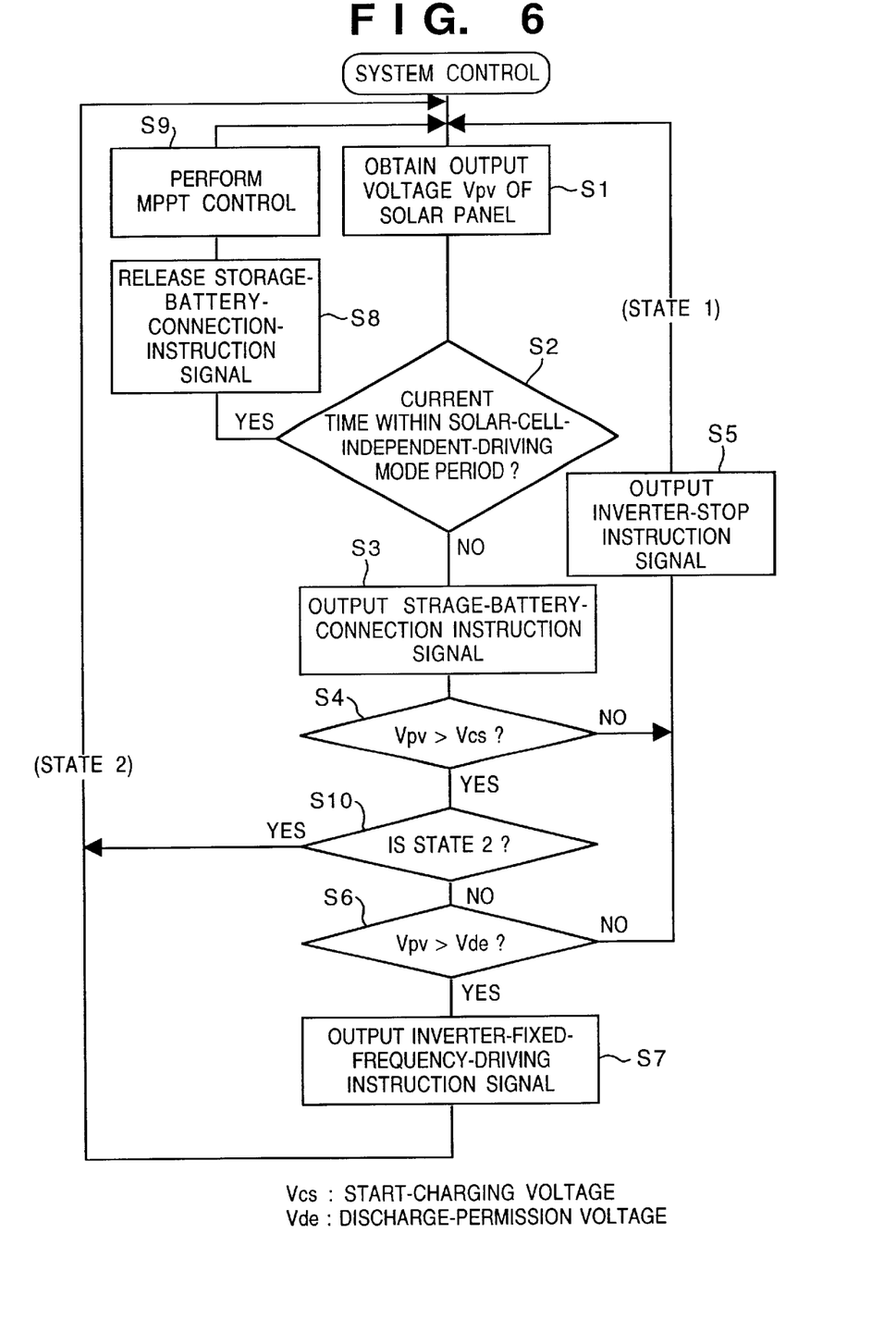
FIG. 6 is a flowchart showing a control method for the pump system according to a first embodiment.

Drawings,
Figure 6, Step 53, "STRAGE-BATTERY" should read -- STORAGE-BATTERY --.
Figure 8, Step 53, "STRAGE-BATTERY" should read -- STORAGE-BATTERY --.

Column 1,
Line 37, "source," should read -- a source, --.

Column 2,
Line 39, "in dependence" should read -- depending --.

Column 4,
Line 36, "The" should read -- the --.

Column 5,
Line 16, "response" should read -- respond --.

Column 7,
Line 10, "to" should read -- into --.
Line 47, "time)" should read -- time)) --.

Column 8,
Line 19, "is proceeded" should read -- proceeds --.
Line 34, "step" should read -- steps --.

Column 9,
Lines 5 and 8, "become" should read -- enter --.
Line 17, "day light" should read -- daylight --.
Line 55, "resisters," should read -- resistors, --.

Column 10,
Line 14, "in dependence" should read -- depending --.
Line 27, "referred" should read -- referred to --.
Line 28, "are" should read -- is --.
Line 44, "can not" should read -- cannot --.
Line 55, "day light," should read -- daylight, --.

UNITED STATES PATENT AND TRADEMARK OFFICE
CERTIFICATE OF CORRECTION

PATENT NO.    : 6,590,793 B1
DATED         : July 8, 2003
INVENTOR(S)   : Yoshitaka Nagao et al.

It is certified that error appears in the above-identified patent and that said Letters Patent is hereby corrected as shown below:

Column 11,
Line 4, "can not" should read -- cannot --.
Line 5, "in" should read -- on --.
Line 16, "configuration is" should read -- configurations are --.
Line 39, "send" should read -- sent --.
Line 54, "comparing" should read -- compared --.
Line 67, "in a sunny" should read -- on a sunny --.

Column 12,
Lines 21 and 27, "condition" should read -- conditions --.
Lines 22 and 32, "comparing" should read -- compared --.
Line 57, "appraise" should read -- apprise --.

Column 13,
Line 30, "form" should read -- from --.

Column 15,
Line 11, "detect" should read -- detects --.

Column 16,
Line 27, "electri" should read -- electric --.
Line 44, "detector which detector which" should read -- detector which --.

Signed and Sealed this

Third Day of February, 2004

JON W. DUDAS
*Acting Director of the United States Patent and Trademark Office*